(12) United States Patent
Kikuchi et al.

(10) Patent No.: US 9,638,307 B2
(45) Date of Patent: May 2, 2017

(54) ELECTRIC POWER STEERING DEVICE

(71) Applicant: JTEKT CORPORATION, Osaka-shi, Osaka (JP)

(72) Inventors: Arata Kikuchi, Kyoto (JP); Hirotsugu Kusano, Kashihara (JP); Yasutaka Fukumoto, Toyota (JP)

(73) Assignee: JTEKT CORPORATION, Kariya-shi (JP)

( * ) Notice: Subject to any disclaimer, the term of this patent is extended or adjusted under 35 U.S.C. 154(b) by 0 days.

(21) Appl. No.: 14/397,269

(22) PCT Filed: Apr. 24, 2013

(86) PCT No.: PCT/JP2013/061986
§ 371 (c)(1),
(2) Date: Oct. 27, 2014

(87) PCT Pub. No.: WO2013/161845
PCT Pub. Date: Oct. 31, 2013

(65) Prior Publication Data
US 2015/0075899 A1 Mar. 19, 2015

(30) Foreign Application Priority Data

Apr. 25, 2012 (JP) .................................. 2012-099628
May 16, 2012 (JP) .................................. 2012-112632

(51) Int. Cl.
*B62D 5/04* (2006.01)
*F16H 55/24* (2006.01)
(Continued)

(52) U.S. Cl.
CPC ............... *F16H 55/24* (2013.01); *B62D 3/04* (2013.01); *B62D 5/0403* (2013.01);
(Continued)

(58) Field of Classification Search
CPC .................................................. B62D 5/0409
(Continued)

(56) References Cited

U.S. PATENT DOCUMENTS 6,900,564 B2 * 5/2005 Kobayashi et al. ............ 310/83
2002/0189892 A1 * 12/2002 Appleyard .................... 180/444
(Continued)

FOREIGN PATENT DOCUMENTS

CN 1599680 A 3/2005
CN 101101054 A 1/2008
(Continued)

OTHER PUBLICATIONS

Delrin Design Information—retreived from http://www2.dupont.com/Plastics/en_US/assets/downloads/design/DELDGe.pdf on May 25, 2016.*
(Continued)

*Primary Examiner* — Joseph Rocca
*Assistant Examiner* — Conan Duda
(74) *Attorney, Agent, or Firm* — Oliff PLC

(57) ABSTRACT

An electric power steering device includes a worm which is swingably connected to the rotation shaft of an electric motor through a joint. A first end portion and second end portion of the worm are supported by a first bearing and a second bearing, respectively. A pair of elastic members elastically urge the worm to an axial neutral position. An annular leaf spring which is held by a housing urges the second end portion toward a worm wheel through the second bearing. A synthetic resin member having a sliding contact surface which is in contact with the leaf spring is integrally disposed on the second bearing.

7 Claims, 10 Drawing Sheets

(51) Int. Cl.

| | | |
|---|---|---|
| *F16C 27/08* | (2006.01) | |
| *F16C 35/077* | (2006.01) | |
| *F16C 23/08* | (2006.01) | |
| *F16C 25/08* | (2006.01) | |
| *F16C 27/06* | (2006.01) | |
| *F16H 57/12* | (2006.01) | |
| *B62D 3/04* | (2006.01) | |
| *F16H 1/16* | (2006.01) | |
| *F16C 19/06* | (2006.01) | |
| *F16H 57/021* | (2012.01) | |
| *F16H 57/02* | (2012.01) | |

(52) U.S. Cl.
CPC .......... *B62D 5/0409* (2013.01); *F16C 23/082* (2013.01); *F16C 25/083* (2013.01); *F16C 27/066* (2013.01); *F16C 27/08* (2013.01); *F16C 35/077* (2013.01); *F16H 57/12* (2013.01); *F16C 19/06* (2013.01); *F16C 2326/24* (2013.01); *F16C 2380/27* (2013.01); *F16H 1/16* (2013.01); *F16H 2057/0213* (2013.01); *F16H 2057/02082* (2013.01); *F16H 2057/127* (2013.01); *Y10T 74/19623* (2015.01)

(58) Field of Classification Search
USPC ......................................................... 180/444
See application file for complete search history.

(56) References Cited

U.S. PATENT DOCUMENTS

| | | | |
|---|---|---|---|
| 2003/0146039 A1 | 8/2003 | Sano et al. | |
| 2004/0245040 A1 | 12/2004 | Eda et al. | |
| 2006/0169528 A1* | 8/2006 | Yuasa et al. ................. | 180/444 |
| 2006/0191738 A1 | 8/2006 | Eda et al. | |
| 2006/0196721 A1* | 9/2006 | Saito et al. ................... | 180/443 |
| 2007/0158131 A1* | 7/2007 | Iwasa et al. .................. | 180/444 |
| 2007/0163374 A1 | 7/2007 | Yamazaki et al. | |
| 2008/0006472 A1 | 1/2008 | Song et al. | |
| 2009/0295325 A1* | 12/2009 | Sekine et al. ................ | 318/646 |
| 2010/0239199 A1* | 9/2010 | Nakagawa .................... | 384/283 |
| 2011/0017542 A1* | 1/2011 | Kim et al. .................... | 180/444 |
| 2011/0067946 A1* | 3/2011 | Kim .............................. | 180/444 |
| 2011/0120797 A1* | 5/2011 | Kitahata et al. ............. | 180/443 |
| 2012/0048640 A1* | 3/2012 | Hamakita ..................... | 180/444 |
| 2012/0061168 A1* | 3/2012 | Hamakita et al. ............ | 180/444 |
| 2012/0111657 A1* | 5/2012 | Hamakita et al. ............ | 180/444 |
| 2012/0125132 A1* | 5/2012 | Bernhard et al. ............ | 74/89.14 |
| 2012/0272765 A1* | 11/2012 | Fuechsel et al. ............. | 74/416 |
| 2012/0322566 A1* | 12/2012 | Kim .............................. | 464/88 |
| 2013/0075189 A1* | 3/2013 | Sekikawa et al. ........... | 180/444 |
| 2013/0133974 A1* | 5/2013 | Hamakita et al. ........... | 180/444 |

FOREIGN PATENT DOCUMENTS

| | | |
|---|---|---|
| DE | 102008009107 A1 | 8/2009 |
| EP | 1 571 067 A1 | 9/2005 |
| JP | H05-89953 U | 12/1993 |
| JP | H06-229425 A | 8/1994 |
| JP | A-7-35147 | 2/1995 |
| JP | 2002-249056 A | 9/2002 |
| JP | 2003-261041 A | 9/2003 |
| JP | A-2004-92750 | 3/2004 |
| JP | 2007-188116 A | 7/2007 |
| JP | A-2007-186116 | 7/2007 |
| JP | A-2007-270943 | 10/2007 |
| JP | 2007-303649 A | 11/2007 |
| JP | A-2009-287647 | 12/2009 |

OTHER PUBLICATIONS

Delrin 500T NC010—retrieved from http://www.totalresin.com/product/product/D500T.pdf on May 25, 2016.*
International Search Report issued in International Patent Application No. PCT/JP2013/061986 dated Jul. 23, 2013 (with translation).
Sep. 10, 2015 Office Action issued in Japanese Patent Application No. 2012-112632.
Mar. 8, 2016 Extended European Search Report issued in EP 13780699.8.
Mar. 3, 2016 Office Action issued in Japanese Patent Application No. 2012-099628.
Feb. 6, 2016 Office Action issued in Chinese Patent Application No. 201380021224.4.
Jun. 2, 2016 Office Action issued in Japanese Patent Application No. 2012-112632.

* cited by examiner

ELECTRIC POWER STEERING DEVICE

TECHNICAL FIELD

The present invention relates to an electric power steering device.

BACKGROUND ART

In an electric power steering device, the output of an electric motor is reduced in speed through a worm and a worm wheel, and then transmitted to a steering mechanism, thereby assisting the torque of the steering operation.

Backlash is required in meshing between a worm and a worm wheel. During traveling, however, there is a possibility that a rattle sound due to backlash may be generated.

Conventionally, therefore, an electric power steering device has been proposed in which a bearing for supporting a worm is elastically urged toward a worm wheel to eliminate backlash.

A technique has been proposed in which, is such an electric power steering device of the type in which a bearing for supporting a worm is elastically urged toward a worm wheel to eliminate backlash, the bearing for supporting the worm is axially preloaded to eliminate play of the bearing, whereby an abnormal sound due to play of the bearing is prevented from being generated (for example, see Patent Literature 1).

CITATION LIST

Patent Literature

Patent Literature 1: JP-A-2009-287647

In Patent Literature 1, a synthetic resin-made outer bush which is fixed to a bush attaching portion of a housing is fitted to the outer ring of the bearing for supporting the worm. Moreover, a synthetic resin member which urges the worm toward the worm wheel, and an urging member which is formed by an elastic material such as rubber are interposed between a cutaway portion disposed in the outer periphery of the outer bush, and the bush attaching portion of the housing.

In Patent Literature 1, when the worm is to be axially moved, there is a possibility that the worm cannot be smoothly axially moved because of the frictional resistance between the urging member and the outer bush. In fine steering in which the worm does not receive a driving force, therefore, the play due to the internal clearance of the bearing cannot be sometimes eliminated. In this case, the steering feeling is impaired.

SUMMARY OF INVENTION

Solution to Problem

According to a first aspect of the invention, an electric power steering device (1) may comprise: a worm (18) having a first end portion (18a) which is connected swingably and torque-transmittably to a rotation shaft (20) of an electric motor (16) through a joint (21), and having a second end portion (18b) which is on a side opposite to the first end portion; a worm wheel (19) which meshes with the worm; a housing (17a) which houses the worm and the worm wheel; a first bearing (25) which is held by the housing, and which rotatably supports the first end portion of the worm; a second bearing (26) which rotatably supports the second end portion of the worm; a pair of elastic members (27A, 27B) which are placed on both sides of the first bearing with respect to an axial direction (X1) of the worm, respectively, and which elastically urge the worm to an axial neutral position; an annular leaf spring (50) which is held by the housing by means of frictional engagement to surround a periphery of the second bearing, and which elastically urges the second end portion of the worm toward the worm wheel through the second bearing; and a synthetic resin member (46) which is disposed on an outer periphery of the second bearing, and which has a sliding contact surface (46b) that is in contact with the leaf spring. The frictional force between the leaf spring and the sliding contact surface of the synthetic resin member may be smaller than a frictional force between the leaf spring and the housing.

The alphanumeric characters in the parentheses represent corresponding components or the like in embodiments which will be described later. Of course, it does not mean that the invention should be limited to the embodiments. This is applicable also to the following description in the paragraph.

According to a second aspect of the invention, the sliding contact surface of the synthetic resin member may have a crowning shape including a convex arcuate surface in a section containing a rotational center (C1) of the worm, and the leaf spring may include a cylindrical surface (51e) with which the sliding contact surface is in sliding contact.

According to a third aspect of the invention, a configuration may be possible where the leaf spring includes: an open-ended annular main body portion (51) which surrounds the sliding contact surface of the synthetic resin member; a pair of rotation limiting portions (52) which extend in a bent manner from a pair of circumferential end portions (51a, 51b) of the main body portion, respectively; and a pair of cantilever-like elastic tongue pieces (53) which extend from the pair of rotation limiting portions, respectively, the housing includes a bearing holding hole (47) which holds the second bearing through the leaf spring, an inner periphery of the bearing holding hole includes a receiving recess (54) which is recessed in a direction opposite to the worm wheel with respect to the second bearing, the receiving recess includes: a bottom (54) which receives tip ends of the pair of elastic tongue pieces; and a pair of inner walls (54a, 54b) which are opposed to each other in circumferential directions (Z1) of the bearing holding hole, and which are respectively engaged with the pair of rotation limiting portions to limit rotation of the leaf spring, and the pair of elastic tongue pieces are configured to apply urging forces (F2, F3) to the second bearing in two directions which are inclined oppositely to each other toward the worm wheel, through the corresponding rotation limiting portions and the corresponding end portions of the main body portion, respectively.

According to a fourth aspect of the invention, an electric power steering device (101; 101A) may comprise: a speed reducer (117) having a worm (118) and a worm wheel (119); an electric motor (116) which drives the worm; a housing (117a) which houses the speed reducer; a first bearing (125) which rotatably supports a first end portion (118a) of the worm; a second bearing (126) which rotatably supports a second end portion (118b) of the worm; a pair of elastic members (127A, 127B) which are placed on both sides of the first bearing with respect to an axial direction (X1) of the worm, respectively, and placed between the first bearing and the housing, or between the first bearing and the worm, and which elastically support the worm in the axial direction; a low-friction resin layer (146) which is disposed on an outer periphery of the second bearing; and a housing hole (147) which is disposed in the housing, which axially movably houses the second bearing where the low-friction resin layer is disposed, and which receives at least a part of the low-friction resin layer directly or indirectly through an interposing member (152, 154).

According to a fifth aspect of the invention, the electric power steering device may further comprise: an urging member (54) which is supported by the housing, and which urges the low-friction resin layer in a direction (Y2) in which a center-to-center distance (D1) between the worm and the worm wheel is decreased; and a joint (21) which is placed between the first end portion of the worm and a rotation shaft of the electric motor, and which swingably connects both shafts together, and axial crowning may be applied to an outer periphery of the low-friction resin layer.

Effects of the Invention

According to the first aspect of the invention, the sliding contact surface of the synthetic resin member which is disposed on the outer periphery of the second bearing is in contact with the leaf spring, and therefore it is possible to prevent the leaf spring from impeding the axial movement of the worm. Consequently, the axial movement of the worm which is urged to the axial neutral position by the pair of elastic members is performed very smoothly, so that, also in fine steering in which the worm does not receive a driving force, the play due to the internal clearances of the bearings can be surely eliminated, and the steering feeling can be improved.

Particularly, the frictional force between the leaf spring and the sliding contact surface of the synthetic resin member is smaller than that between the leaf spring and the housing, and therefore it is possible to surely prevent the leaf spring held by the housing, from impeding the axial movement of the worm.

Furthermore, the pair of elastic members which are placed on the both sides of the first bearing urge the worm in the axial directions, and the leaf spring which surrounds the second bearing surrounds the periphery of the second bearing, and causes the worm to swing. In the type in which the function of urging the worm in the axial directions, and that of urging the worm in a radial direction (toward the worm wheel) are placed in the both ends of the worm, respectively, namely, the steering feeling in fine steering can be improved.

According to the second aspect of the invention, axial crowning is applied to the sliding contact surface of the synthetic resin member, and therefore a sufficient swing amount can be ensured when the worm is caused to swing by a reverse input from the road surface. Consequently, the prying of the worm can be prevented from occurring. Moreover, the crowning can reduce the contact area of the sliding contact surface of the synthetic resin member with respect to the leaf spring, and therefore the swinging and axial movement of the worm can be performed more smoothly. Moreover, the contact is formed between the sliding contact surface having a crowning shape, and the cylindrical surface, and therefore the smoothness of the swinging and axial movement of the worm can be attained at a low cost.

According to the third aspect of the invention, a resultant force in the circumferential whole area of the open-ended annular main body portion which surrounds the outer periphery of the second bearing (outer periphery of the synthetic resin member) urges the second bearing in a direction of separating from the worm wheel. On the other hand, the pair of elastic tongue pieces urge the second bearing in two directions which are inclined oppositely to each other toward the worm wheel, through the corresponding rotation limiting portions. Namely, the second bearing is urged in the three directions by the leaf spring. With respect to play in a lateral direction (direction perpendicular to the directions in which the center-to-center distance between the worm and the worm wheel is increased and decreased), therefore, the movement of the second bearing can be easily suppressed. Consequently, an abnormal sound due to play of the second bearing and the bearing holding hole of the housing can be prevented from being generated.

According to the fourth aspect of the invention, the low-friction resin layer is disposed on the outer periphery of the second bearing, and therefore the frictional resistance between the housing hole and the low-friction resin layer or that between the interposing member and the low-friction resin layer can be reduced. Consequently, the axial movement of the worm which is axially urged by the pair of elastic members that are on the both sides of the first bearing is performed very smoothly, so that, also in fine steering in which the worm does not receive a driving force, the play due to the internal clearances of the two bearings can be surely eliminated, and the steering feeling can be improved. Moreover, a shock in a reverse input from the road surface can be buffered by the low-friction resin layer.

According to the fifth aspect of the invention, axial crowning is applied to the outer periphery of the low-friction resin layer, and therefore a sufficient swing amount can be ensured when the worm is caused to swing by a reverse input from the road surface. Consequently, the prying of the worm can be prevented from occurring. Moreover, the crowning can reduce the contact area between the housing hole and the low-friction resin layer or that between the interposing member and the low-friction resin layer, and therefore the swinging and axial movement of the worm can be performed more smoothly.

DESCRIPTION OF EMBODIMENTS

Preferred embodiments of the invention will be described with reference to the accompanying drawings.

Figure 1:
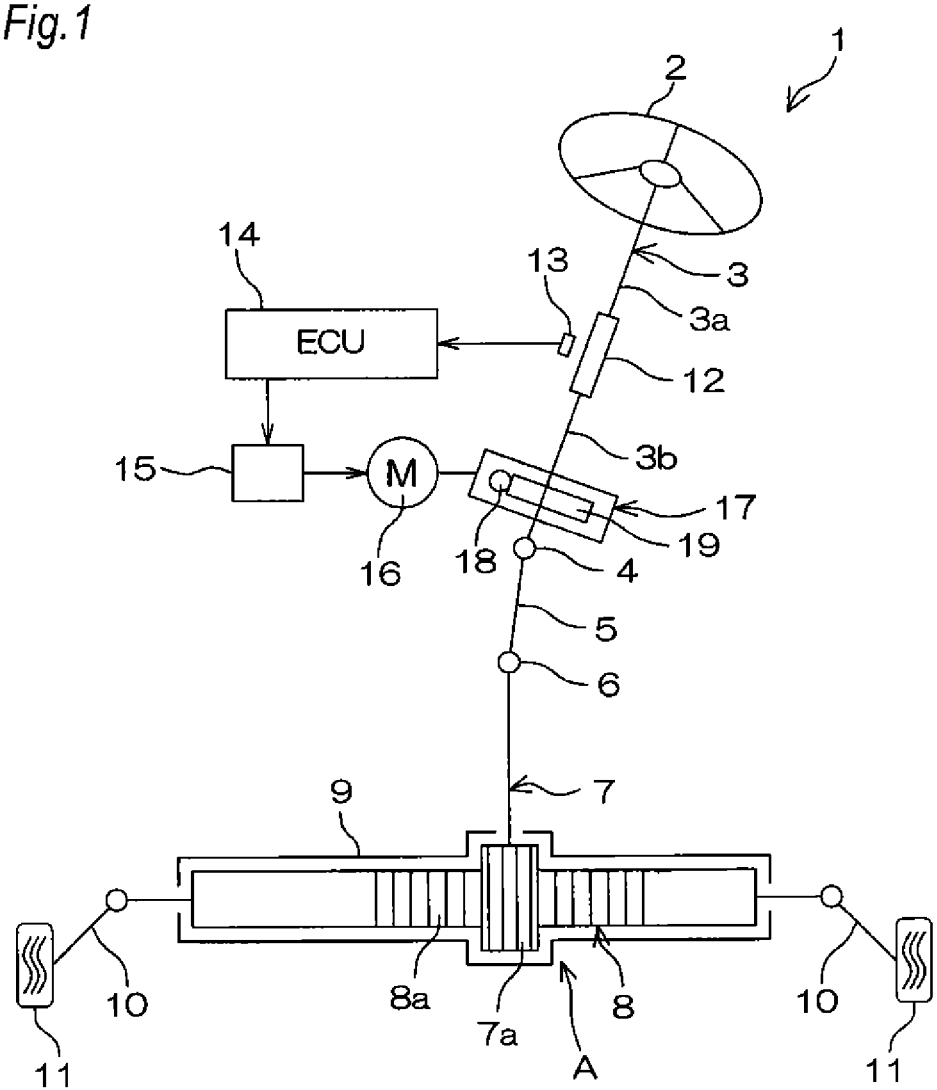
FIG. 1 is a schematic view of an electric power steering device of a first embodiment and schematically showing the configuration of the electric power steering device.

FIG. 1 is a schematic view of an electric power steering device of a first embodiment. Referring to FIG. 1, the electric power steering device 1 has: a steering shaft 3 which is connected to a steering member 2 such as a steering wheel; an intermediate shaft 5 which is connected to the steering shaft 3 through a universal joint 4; a pinion shaft 7 which is connected to the intermediate shaft 5 through a universal joint 6; and a rack bar 8 which has a rack 8a meshing with a pinion 7a disposed in the vicinity of an end portion of the pinion shaft 7, and which serves as a steerable shaft extending in the right-and-left direction of an automobile. The pinion shaft 7 and the rack bar 8 constitute a steering mechanism A configured by a rack-and-pinion mechanism.

The rack bar 8 is supported in a housing 9 fixed to the vehicle body, so as to be linearly reciprocable, through a plurality of bearings (not shown). Both end portions of the rack bar 8 are projected toward the both sides of the housing 9, and tie rods 10 are coupled to the end portions, respectively. Each of the tie rods 10 is connected to a corresponding steerable wheel 11 through a corresponding knuckle arm (not shown).

When the steering member 2 is operated and the steering shaft 3 is rotated, the rotation is converted to linear motion of the rack bar 8 in the right-and-left direction of the automobile, through the pinion 7a and the rack 8a. Therefore, the steering by the steering wheel 11 is attained.

The steering shaft 3 includes: an input-side first steering axle 3a in which the steering member 2 is connected to one end; an output-side second steering axle 3b which is continuous to the pinion shaft 7; and a torsion bar 12 which connects the first steering axle 3a and the second steering axle 3b together so as to be relatively rotatable on the same axis.

A torque sensor 13 is disposed which detects a steering torque based on the amount of relative rotational displacement that is produced between the first steering axle 3a and the second steering axle 3b through the torsion bar 12. The result of the torque detection performed by the torque sensor 13 is given to an ECU (Electronic Control Unit) 14. The ECU 14 controls the driving of an electric motor 16 for steering assist, through a driving circuit 15 based on the torque detection result, a vehicle speed detection result given from a vehicle speed sensor (not shown), and the like.

The output rotation of the electric motor 16 is reduced in speed through a speed reducer 17 serving as a transmission device, then transmitted to the pinion shaft 7, and converted to linear motion of the rack bar 8 to assist the steering. The speed reducer 17 includes a worm 18 serving as a driving gear which is rotated by the electric motor 16, and a worm wheel 19 serving as a driven gear which meshes with the worm 18, and which is connected to the second steering axle 3b of the steering shaft 3 so as to be rotatable integrally therewith.

Figure 2:
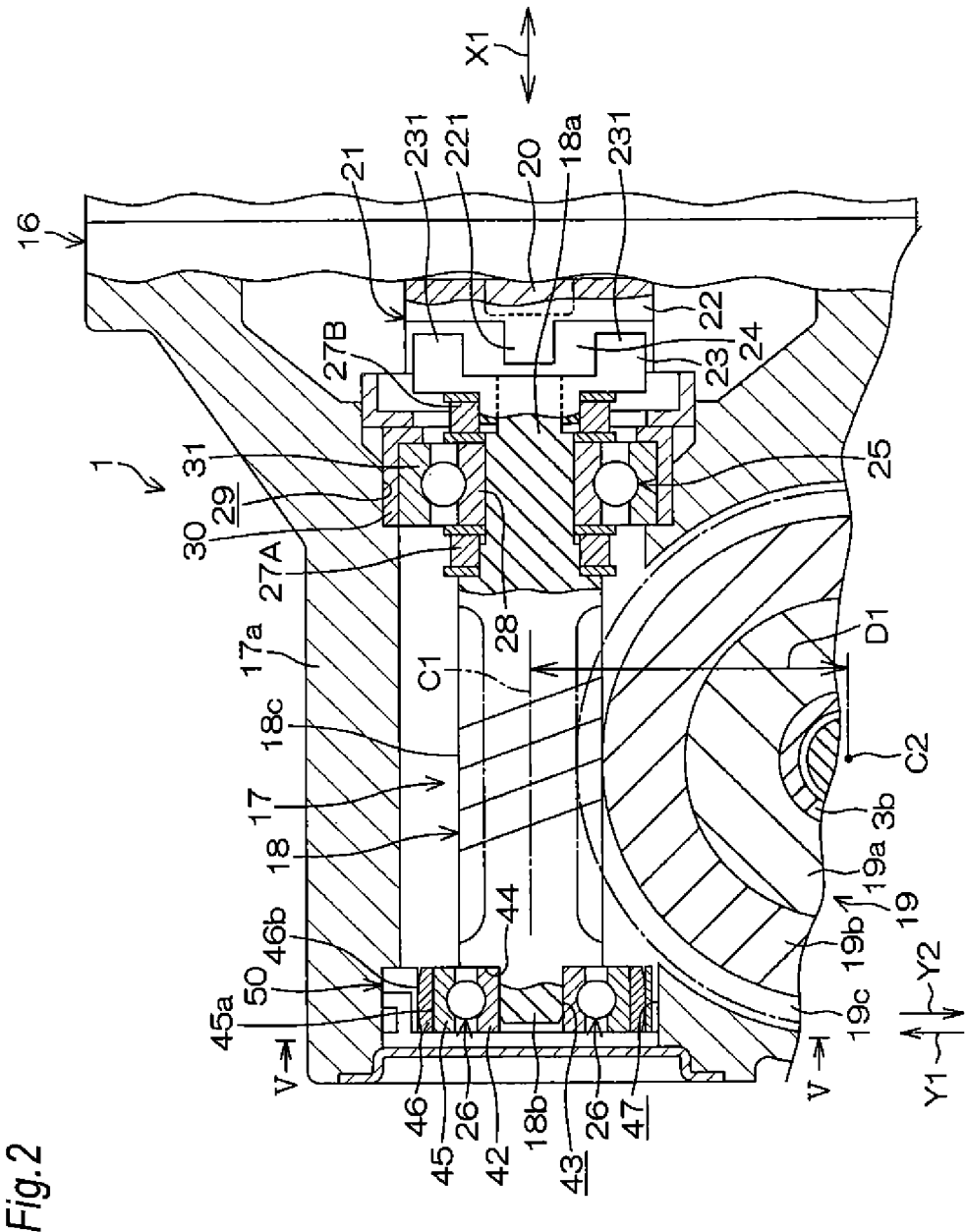
FIG. 2 is a sectional view of main portions of the electric power steering device.

As shown in FIG. 2, the worm 18 is placed coaxially with the rotation shaft 20 of the electric motor 16. The worm 18 has a first end portion 18a and second end portion 18b which are separated from each other in the axis longitudinal direction of the worm, and a tooth portion 18c in an intermediate portion between the first end portion 18a and the second end portion 18b.

The worm wheel 19 is connected to the axial intermediate portion of the second steering axle 3b of the steering shaft 3 so as to be rotatable integrally therewith and axially immovable. The worm wheel 19 includes an annular mandrel 19a which is coupled to the second steering axle 3b so as to be rotatable integrally therewith, and a synthetic resin member 19b which surrounds the periphery of the mandrel 19a, and in which a tooth portion 19c is formed in the outer periphery. When the synthetic resin member 19b is to be resin-molded, for example, the mandrel 19a is inserted into a die.

The first end portion 18a of the worm 1B, and an end portion of the rotation shaft 20 (output shaft) of the electric motor 16 which is opposed thereto are connected to each other through a joint 21 so as to be able to transmit a torque and mutually swingable. Specifically, the joint 21 includes: a first engaging member 22 which is connected to the rotation shaft 20 of the electric motor 16 so as to be rotatable integrally therewith and axially immovable; a second engaging member 23 which is connected to the first end portion 18a of the worm 18 so as to be rotatable integrally therewith and axially immovable; and an elastic member 24 which is interposed between the first engaging member 22 and the second engaging member 23, and which transmits a torque between the engaging members 22, 23.

In the first engaging member 22 and the second engaging member 23, their engagement projections 221, 231 are placed alternately in the circumferential direction. Although not illustrated, the elastic member 24 has a plurality of engagement arms which radially extend from the annular main body portion. A corresponding one of the engagement arms of the elastic member 24 is sandwiched between circumferentially adjacent engagement projections 221, 231 of the engaging members 22, 23. Swinging of the worm 18 with respect to the rotation shaft 20 is enabled by elastic deformation of the elastic member 24 of the joint 21.

Figure 3:
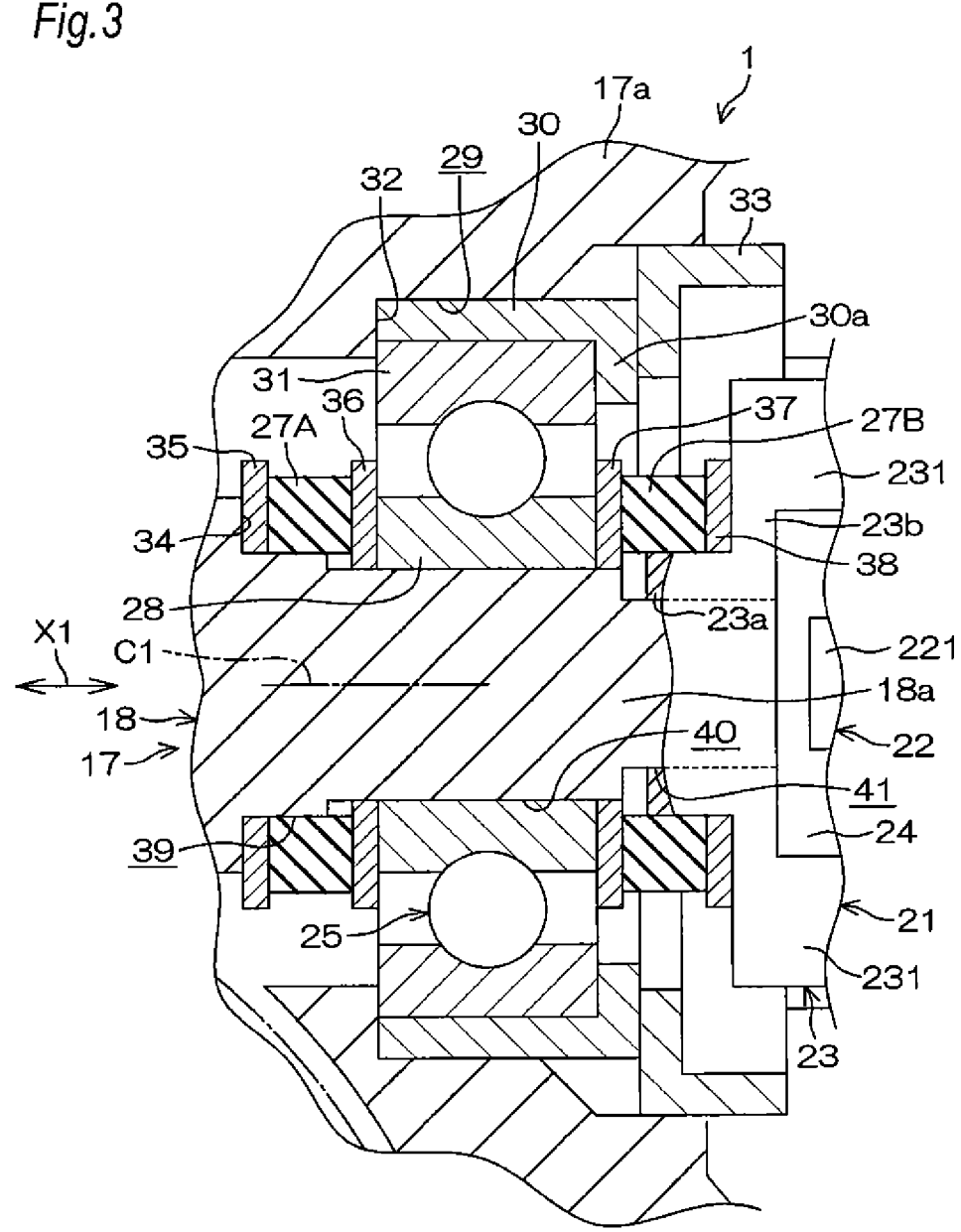
FIG. 3 is an enlarged sectional view of main portions of the electric power steering device and showing the periphery of a first end portion of a worm.

As shown in FIG. 3 in which a part of FIG. 2 is enlarged, the second engaging member 23 includes a boss 23a which is fitted to the first end portion 18a of the worm 18 so as to be rotatable integrally therewith and axially immovable, and an annular flange 23b which radially outward extends from the boss 23a. The engagement projections axially extend from the annular flange 23b.

Referring again to FIG. 2, the first end portion 18a of the worm 18 is rotatably supported by a housing 17a of the speed reducer 17 through a first bearing 25. The second end portion 18b of the worm 18 is rotatably supported by the housing 17a of the speed reducer 17 through a second bearing 26. The first bearing 25 and the second bearing 26 are configured by, for example, ball bearings. A pair of elastic members 27A, 27B which elastically urge the worm 18 to the axial neutral position are placed on the first end portion 18a of the worm 18.

The first bearing 25 includes an inner ring 28 which is fitted to the first end portion 18a of the worm 18 so as to be rotatable integrally therewith, and an outer ring 31 which is held by a bearing holding hole 29 disposed in the housing 17a of the speed reducer 17, through a bush 30.

As shown in FIG. 3, the outer ring 31 and an annular flange 30a of an end portion of the bush 30 are axially clamped between a positioning step 32 disposed in an end portion of the bearing holding hole 29, and a detention member 33 which is screw-fitted to the bearing holding hole 29. This limits the axial movement of the outer ring 31.

The inner ring 28 of the first bearing 25 is fitted to the outer periphery of the first end portion 18a of the worm 18 so as to be rotatable integrally therewith. The pair of elastic members 27A, 27B are placed on the both axial sides of the inner ring 28 respectively, and urge the worm 18 to the axial neutral position. The elastic members 27A, 27B are bushes formed by an elastic material such as rubber or a thermoplastic elastomer.

The one elastic member 27A is interposed between an annular receiving plate 35 which butts against a positioning step 34 of the outer periphery of the worm 18, and an annular receiving plate 36 which butts against one end surface of the inner ring 28. The other elastic member 27B is interposed between an annular receiving plate 37 which butts against the other end surface of the inner ring 28, and a receiving plate 38 which butts against the annular flange 23b of the second engaging member 23 of the joint 21. The receiving plates 35, 36, 37, 38 are made of, for example, a metal.

A first annular recess 39 into which the receiving plate 35 and the one elastic member 27A are fitted, a second annular recess 40 into which the inner ring 28 is fitted, and a third annular recess 41 into which the boss 23a of the second engaging member 23 is fitted are disposed in the outer periphery of the first end portion 18a. The outer diameters of the first annular recess 39, the second annular recess 40, and the third annular recess 41 are stepwise reduced in this sequence.

Figure 4:
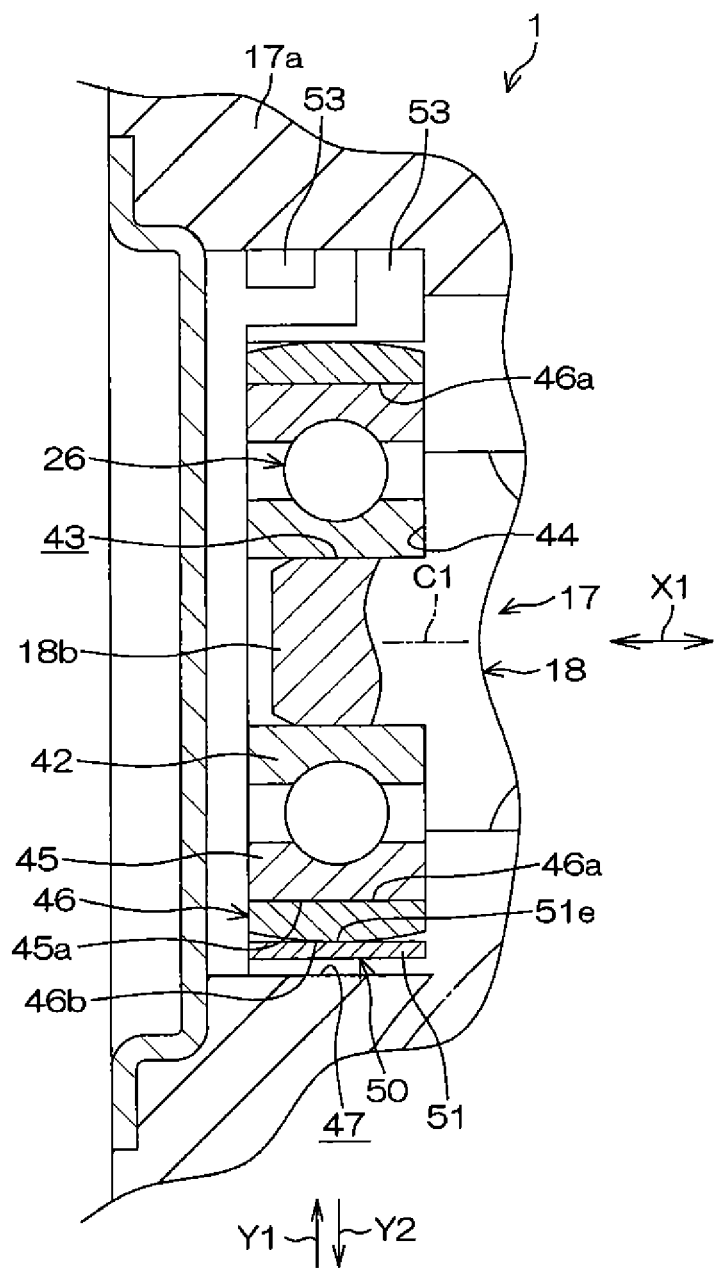
FIG. 4 is an enlarged sectional view of main portions of the electric power steering device and showing the periphery of a second end portion of the worm.

As shown in FIG. 2 and FIG. 4 in which a part of FIG. 2 is enlarged, the inner ring 42 of the second bearing 26 is fitted to a fourth annular recess 43 which is disposed in the outer periphery of the second end portion 18b of the worm 18, so as to be rotatable integrally therewith. The one end surface of the inner ring 42 butts against a positioning step 44 disposed in the outer periphery of the second end portion 18b, thereby limiting the axial movement of the inner ring 42 with respect to the worm 18.

An annular synthetic resin member 46 which is made of a low-friction resin such as polyacetal is integrated by fitting with the outer periphery 45a of the outer ring 45 of the second bearing 26. The inner periphery 46a of the synthetic resin member 46 is configured by a cylindrical surface which extends along the outer periphery 45a of the outer ring 45. An axial section (corresponding to a section including the rotation center C1 of the worm) of a sliding contact surface 46b disposed on the outer periphery of the synthetic resin member 46 has a crowning shape including a convex arcuate surface.

A bearing holding hole 47 for holding the second bearing 26 is disposed in the housing 17a. The bearing holding hole 47 is formed into a bias bore which can biasably hold the second bearing 26 in directions Y1, Y2 (the increasing direction Y1 and the decreasing direction Y2) in which the center-to-center distance D1 (corresponding to the distance between the rotation center C1 of the worm 18 and the rotation center C2 of the worm wheel 19) between the worm 18 and the worm wheel 19 is increased and decreased.

An annular leaf spring 50 is interposed between the inner periphery of the bearing holding hole 47, and the sliding contact surface 46b on the outer periphery of the synthetic resin member 46 which is integrated with the outer ring 27 of the second bearing 26. The leaf spring 50 urges the second bearing 26 in the direction Y2 in which the center-to-center distance D1 is decreased.

Figure 5:
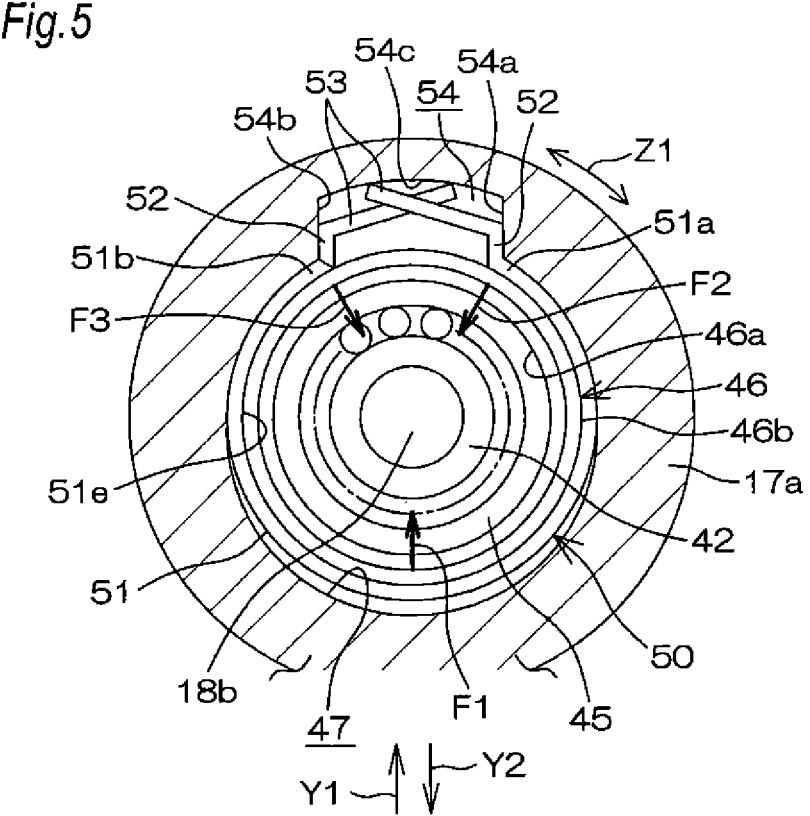
FIG. 5 is a sectional view taken along line V-V in FIG. 2.

The leaf spring 50 is a thin plate-like member which is formed by, for example, a sheet metal. Referring to FIG. 5 which is a sectional view taken along line V-V in FIG. 2, and FIG. 6 which is a perspective view, the leaf spring 50 includes: a main body portion 51 having an open-ended annular shape which surrounds the sliding contact surface 46b of the outer periphery of the synthetic resin member 46 that is integrated with the outer ring 45 of the second bearing 26; a pair of rotation limiting portions 52 which extend in a bent manner from a first end portion 51a and second end portion 51b that are circumferential end portions of the main body portion 51, respectively; and a pair of cantilever-like elastic tongue pieces 53 which extend in a bent manner from the rotation limiting portions 52, respectively. The widths of the rotation limiting portions 52 are made smaller than the width of the main body portion 51. The main body portion 51 is held by the inner periphery of the bearing holding hole 47 of the housing 17a by means of frictional engagement.

As shown in FIG. 4, the inner periphery 51e (cylindrical surface) of the main body portion 51 of the leaf spring 50 butts against an apex portion of the sliding contact surface 46b of the synthetic resin member 46. The frictional force between (the inner periphery 51e of) the leaf spring 50 and the sliding contact surface 46b of the synthetic resin member 46 is smaller than that between the leaf spring 50 and the housing 17a.

Figure 6:
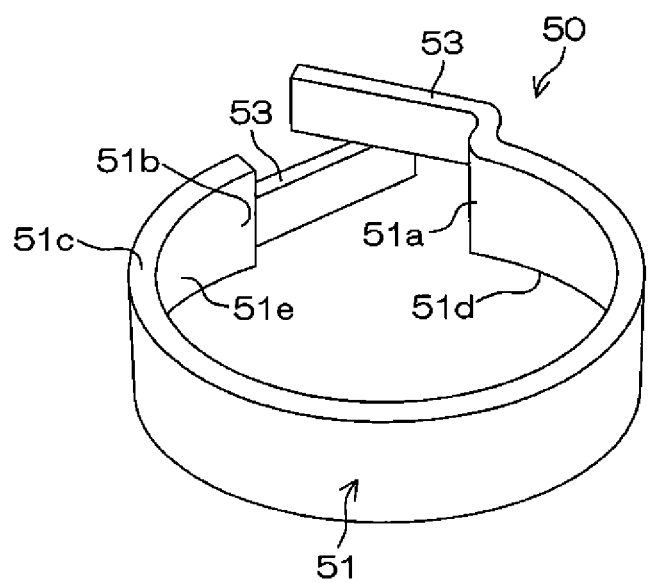
FIG. 6 is a perspective view of a leaf spring.

As shown in FIG. 6, one of the pair of elastic tongue pieces 53 is placed on the side of a first side edge 51c, and the other elastic tongue piece 53 is placed on the side of a second side edge 51d, whereby the elastic tongue pieces are staggered.

Referring again to FIG. 5, in the bearing holding hole 47 of the housing 17a, a receiving recess 54 which is recessed in a direction which is opposite to the worm wheel 19 (in the direction Y2 in which the center-to-center distance D1 is decreased), (in the direction Y1 in which the center-to-center distance is increased) with respect to the second bearing 26 is formed in a part of the inner periphery of the hole. The tip ends of the elastic tongue pieces 53 of the leaf spring 50 are received by the bottom 54c of the receiving recess 54 of the bearing holding hole 47, and the urging forces of the elastic tongue pieces 53 urge the second end portion 18b of the worm 18 through the second bearing 26 in the direction Y2 in which the center-to-center distance D1 is decreased.

The receiving recess 54 has a pair of inner walls 54a, 54b which are opposed to each other in the circumferential directions Z1 of the bearing holding hole 47. The rotation limiting portions 52 of the leaf spring 50 butt against the corresponding inner walls 54a, 54b to limit rotations of the leaf spring 50 in the circumferential directions Z1 of the bearing holding hole 47.

According to the embodiment, the sliding contact surface 46b of the outer periphery of the synthetic resin member 46 disposed on the outer periphery (outer periphery 45a of the outer ring 45) of the second bearing 26 is in contact with the leaf spring 50 (inner periphery 51e of the main body portion 51), and therefore it is possible to prevent the leaf spring 50 from impeding the axial movement of the worm 18. Consequently, the axial movement of the worm 18 which is urged to the neutral position in the axial directions X1 by the pair of elastic members 27A, 27B is performed very smoothly, so that, also in fine steering in which the worm 18 does not receive a driving force, the play due to the internal clearances of the bearings 25, 28 can be surely eliminated, and the steering feeling can be improved.

Moreover, the frictional force between the leaf spring 50 and the sliding contact surface 46b of the synthetic resin member 46 is smaller than that between the leaf spring 50 and the housing 17a, and therefore it is possible to surely prevent the leaf spring 50 held by the housing 17a, from impeding the movement of the worm 18 in the axial directions X1.

Furthermore, the pair of elastic members 27A, 27B which are placed respectively on the both sides of (the inner ring 28 of) the first bearing 25 urge the worm 18 in the axial directions X1, and the leaf spring 50 surrounds the periphery of the second bearing 26, and causes the worm 18 to swing. In the type in which the function of urging the worm 18 in the axial directions X2, and that of urging the worm 18 in a radial direction (toward the worm wheel 19) are placed in the both ends of the worm 18, respectively, namely, the steering feeling in fine steering can be improved.

Furthermore, the synthetic resin member 46 performs a function of, when receiving a reverse input from the road surface, buffering a shock due to the reverse input. In a reverse input, therefore, the meshing portion between the worm 18 and the worm wheel 19 can be protected.

Furthermore, axial crowning (crowing including a convex arcuate surface in the axial section) is applied to the sliding contact surface 46b of the synthetic resin member 46, and therefore a sufficient swing amount can be ensured when the worm 18 is caused to swing by a reverse input from the road surface. Consequently, the prying of the worm 18 can be prevented from occurring. Moreover, the crowning can reduce the contact area of the sliding contact surface 46b of the synthetic resin 46 with respect to (the inner periphery 51e of the main body portion 51 of) the leaf spring 50, and therefore the swinging and axial movement of the worm 18 can be performed more smoothly.

Moreover, the contact is formed between the sliding contact surface 46b having a crowning shape, and the cylindrical surface (inner periphery 51e of the main body portion 51), and therefore the smoothness of the swinging and axial movement of the worm 18 can be attained at a low cost. As compared with the case where a spherical bearing is used, namely, smooth swinging of the worm 18 can be allowed very economically, and moreover the axial movement of the worm 18 which cannot be performed by a spherical bearing can be smoothly allowed.

Referring to FIG. 5, a resultant force in the whole area in the circumferential directions Z1 of the open-ended annular main body portion 51 which surrounds the outer periphery of the second bearing 26 (outer periphery of the synthetic resin member 46) is an urging force F1 which urges the second bearing 26 in a direction of separating from the worm wheel 19. On the other hand, the pair of elastic tongue pieces 53 apply urging forces F2, F3 to the second bearing 26 in two directions which are inclined oppositely to each other toward the worm wheel 19, through the corresponding rotation limiting portions 52.

Namely, the second bearing 26 is urged in the three directions by the leaf spring 50. With respect to play in lateral directions (directions perpendicular to the direction in which the center-to-center distance is increased and decreased), therefore, the movement of the second bearing 26 can be easily suppressed. Consequently, an abnormal sound due to play of the second bearing 26 and the bearing holding hole 47 of the housing 17a can be prevented from being generated.

Figure 7:
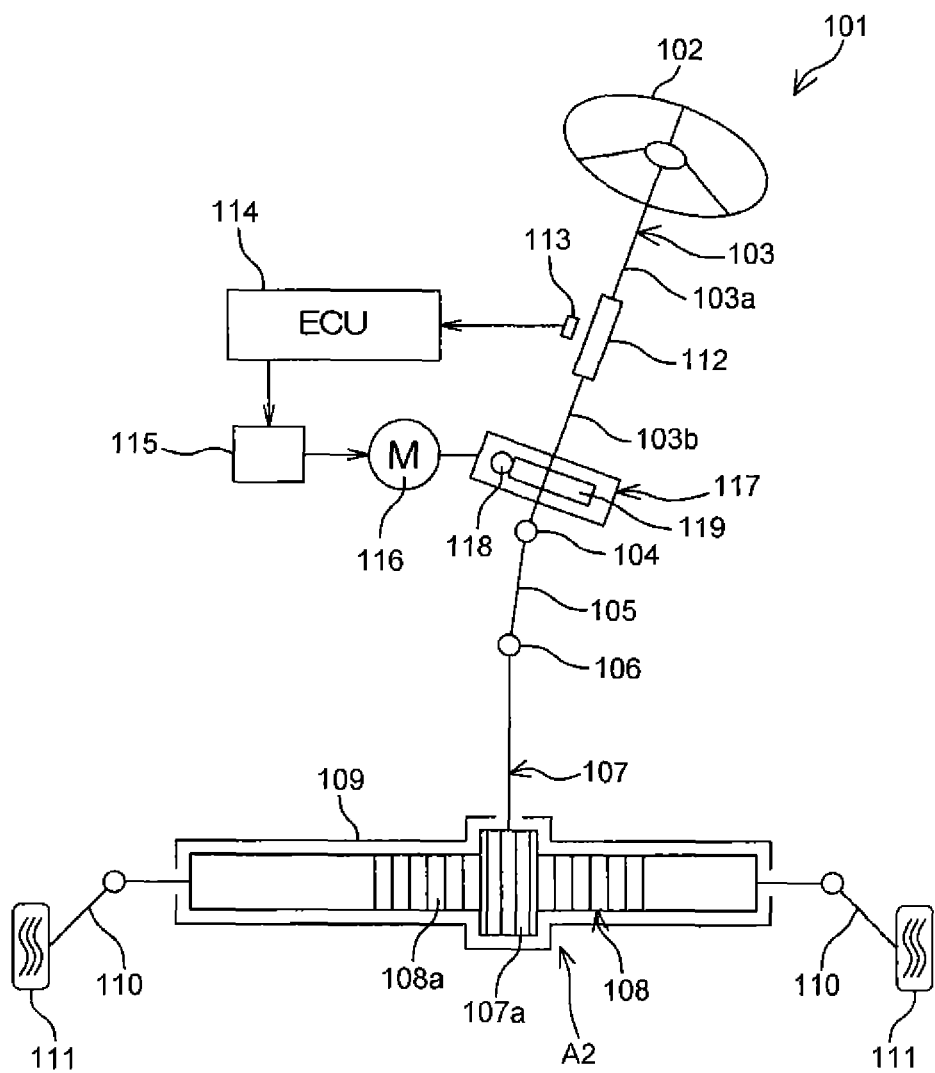
FIG. 7 is a schematic view of an electric power steering device of a second embodiment and schematically showing the configuration of the electric power steering device.

FIG. 7 is a schematic view of an electric power steering device of a second embodiment. Referring to FIG. 7, the electric power steering device 101 has: a steering shaft 103 which is connected to a steering member 102 such as a steering wheel; an intermediate shaft 105 which is connected to the steering shaft 103 through a universal joint 104; a pinion shaft 107 which is connected to the intermediate shaft 105 through a universal joint 106; and a rack bar 108 which has a rack 108a meshing with a pinion 107a disposed in the vicinity of an end portion of the pinion shaft 107, and which serves as a steerable shaft extending in the right-and-left direction of an automobile. The pinion shaft 107 and the rack bar 108 constitute a steering mechanism A2 configured by a rack-and-pinion mechanism.

The rack bar 108 is supported in a housing 109 fixed to the vehicle body, so as to be linearly reciprocable, through a plurality of bearings (not shown). Both end portions of the rack bar 108 are projected toward the both sides of the housing 109, and tie rods 110 are coupled to the end portions, respectively. Each of the tie rods 110 is connected to a corresponding steerable wheel 111 through a corresponding knuckle arm (not shown).

When the steering member 102 is operated and the steering shaft 103 is rotated, the rotation is converted to linear motion of the rack bar 108 in the right-and-left direction of the automobile, through the pinion 107a and the rack 108a. Therefore, the steering by the steering wheel 111 is attained.

The steering shaft 103 includes: an input-side first steering axle 103a in which the steering member 102 is connected to one end; an output-side second steering axle 103b which is continuous to the pinion shaft 107; and a torsion bar 112 which connects the first steering axle 103a and the second steering axle 103b together so as to be relatively rotatable on the same axis.

A torque sensor 113 is disposed which detects a steering torque based on the amount of relative rotational displacement that is produced between the first steering axle 103a and the second steering axle 103b through the torsion bar 112. The result of the torque detection performed by the torque sensor 113 is given to an ECU (Electronic Control Unit) 114. The ECU 114 controls the driving of an electric motor 116 for steering assist, through a driving circuit 115 based on the torque detection result, a vehicle speed detection result given from a vehicle speed sensor (not shown), and the like.

The output rotation of the electric motor 116 is reduced in speed through a speed reducer 117 serving as a transmission device, then transmitted to the pinion shaft 107, and converted to linear motion of the rack bar 108 to assist the steering. The speed reducer 117 includes a worm 118 serving as a driving gear which is rotated by the electric motor 116, and a worm wheel 119 serving as a driven gear which meshes with the worm 118, and which is connected to the second steering axle 103b of the steering shaft 103 so as to be rotatable integrally therewith.

Figure 8:
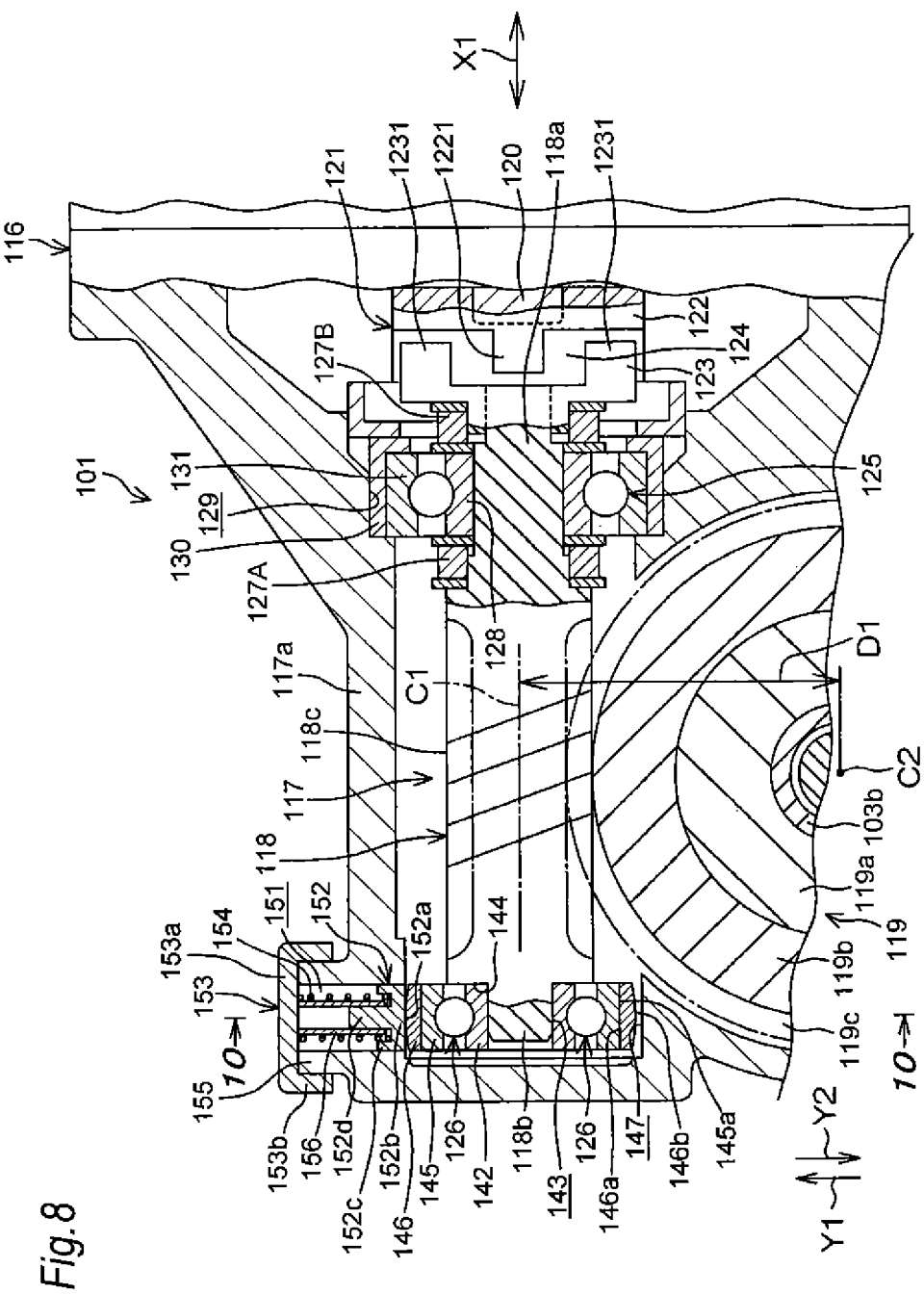
FIG. 8 is a sectional view of main portions of the electric power steering device.

As shown in FIG. 8, the worm 118 is placed coaxially with the rotation shaft 120 of the electric motor 116. The worm 118 has a first end portion 118a and second end portion 118b which are separated from each other in the axial direction X1 of the worm, and a tooth portion 118c in an intermediate portion between the first end portion 118a and the second end portion 118b.

The worm wheel 119 is connected to the axial intermediate portion of the second steering axle 103b of the steering shaft 103 so as to be rotatable integrally therewith and axially immovable. The worm wheel 119 includes an annular mandrel 119a which is coupled to the second steering axle 103b so as to be rotatable integrally therewith, and a synthetic resin member 119b which surrounds the periphery of the mandrel 119a, and in which a tooth portion 119c is formed in the outer periphery. When the synthetic resin member 119b is to be resin-molded, for example, the mandrel 119a is inserted into a die.

The first end portion 118a of the worm 118, and an end portion of the rotation shaft 120 (output shaft) of the electric motor 116 which is opposed thereto are connected to each other through a joint 121 so as to be able to transmit a torque and mutually swingable. Specifically, the joint 121 includes: a first engaging member 122 which is connected to the rotation shaft 120 of the electric motor 116 so as to be rotatable integrally therewith and axially immovable; a second engaging member 123 which is connected to the first end portion 118a of the worm 118 so as to be rotatable integrally therewith and axially immovable; and an elastic member 124 which is interposed between the first engaging member 122 and the second engaging member 123, and which transmits a torque between the engaging members 122, 123.

In the first engaging member 122 and the second engaging member 123, their engagement projections 1221, 1231 are placed alternately in the circumferential direction. Although not illustrated, the elastic member 124 has a plurality of engagement arms which radially extend from the annular main body portion. A corresponding one of the engagement arms of the elastic member 124 is sandwiched between circumferentially adjacent engagement projections 1221, 1231 of the engaging members 122, 123. Swinging of the worm 118 with respect to the rotation shaft 120 is enabled by elastic deformation of the elastic member 124 of the joint 121.

Figure 9:
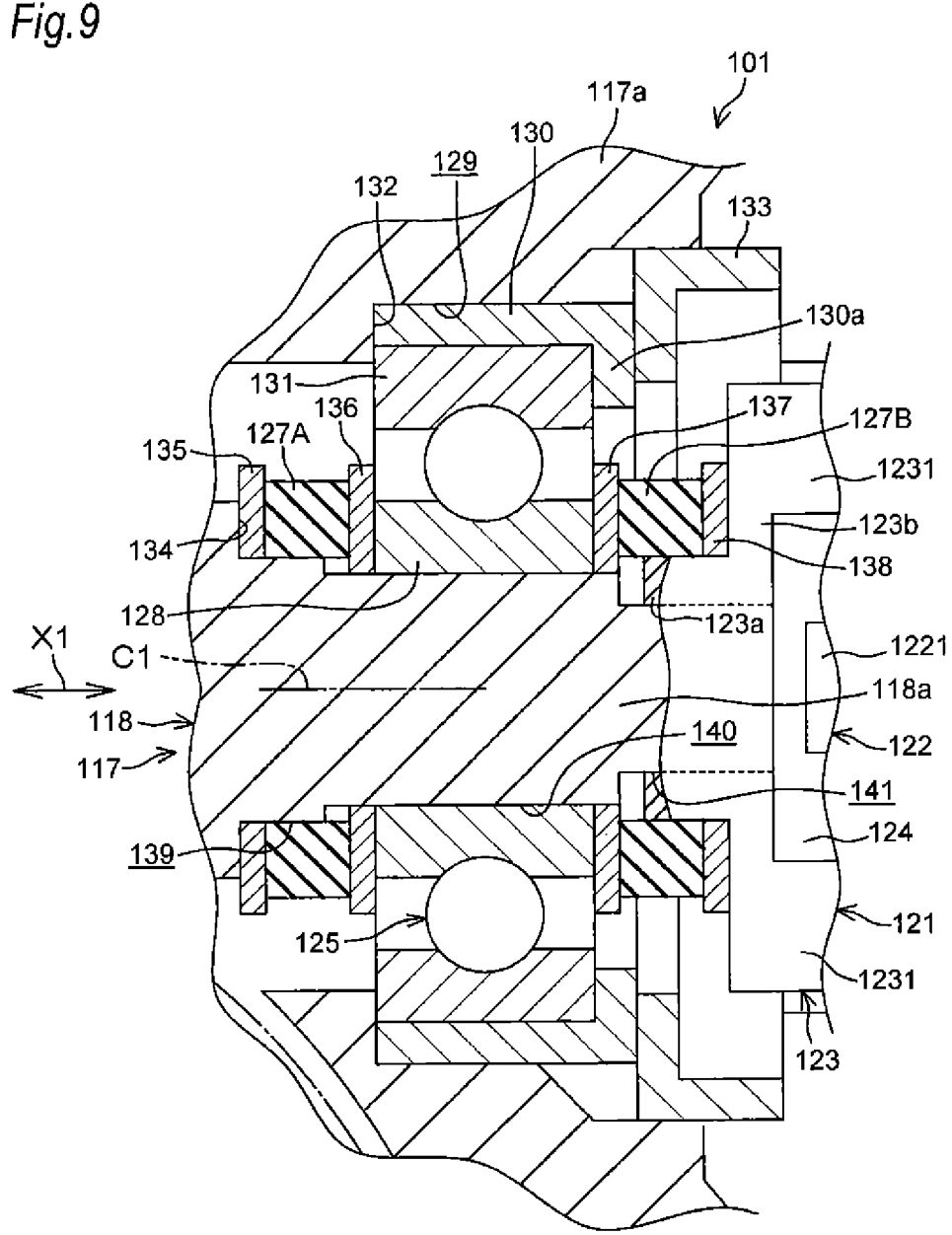
FIG. 9 is an enlarged sectional view of main portions of the electric power steering device and showing the periphery of a first end portion of a worm.

As shown in FIG. 9 in which a part of FIG. 8 is enlarged, the second engaging member 123 includes a boss 123a which is fitted to the first end portion 118a of the worm 118 so as to be rotatable integrally therewith and axially immovable, and an annular flange 123b which radially outward extends from the boss 123a. The engagement projections axially extend from the annular flange 123b.

Referring again to FIG. 8, the first end portion 118a of the worm 118 is rotatably supported by a housing 117a of the speed reducer 117 through a first bearing 125. The second end portion 118b of the worm 118 is rotatably supported by the housing 117a of the speed reducer 117 through a second bearing 126. The first bearing 125 and the second bearing 126 are configured by, for example, ball bearings. A pair of elastic members 127A, 127B which elastically urge the worm 118 to the neutral position in the axial directions X1 are placed on the first end portion 118a of the worm 118.

The first bearing 125 includes an inner ring 128 which is fitted to the first end portion 118a of the worm 118 so as to be rotatable integrally therewith, and an outer ring 131 which is held by a bearing holding hole 129 disposed in the housing 117a of the speed reducer 117, through a bush 130.

As shown in FIG. 9, the outer ring 131 and an annular flange 130a of an end portion of the bush 130 are axially clamped between a positioning step 132 disposed in an end portion of the bearing holding hole 129, and a detention member 133 which is screw-fitted to the inlet of the bearing holding hole 129. This limits the axial movement of the outer ring 131.

The inner ring 128 of the first bearing 125 is fitted to the outer periphery of the first end portion 118a of the worm 118 so as to be rotatable integrally therewith. The pair of elastic members 127A, 127B are placed on the both axial sides of the inner ring 128, respectively, and urge the worm 118 to the neutral position in the axial directions X1. The elastic members 127A, 127B are bushes formed by an elastic material such as rubber or a thermoplastic elastomer.

The one elastic member 127A is interposed between an annular receiving plate 135 which butts against a positioning step 134 of the outer periphery of the worm 118, and an annular receiving plate 136 which butts against one end surface of the inner ring 128. The other elastic member 127B is interposed between an annular receiving plate 137 which butts against the other end surface of the inner ring 128, and a receiving plate 138 which butts against the annular flange 123b of the second engaging member 123 of the joint 121. The receiving plates 135, 136, 137, 138 are made of, for example, a metal.

A first annular recess 139 into which the receiving plate 135 and the one elastic member 127A are fitted, a second annular recess 140 into which the inner ring 12B is fitted, and a third annular recess 141 into which the boss 123a of the second engaging member 123 is fitted are disposed in the outer periphery of the first end portion 118a. The outer diameters of the first annular recess 139, the second annular recess 140, and the third annular recess 141 are stepwise reduced in this sequence.

Referring again to FIG. 8, the inner ring 142 of the second bearing 126 is fitted to a fourth annular recess 143 which is disposed in the outer periphery of the second end portion 118b of the worm 118, so as to be rotatable integrally therewith. The one end surface of the inner ring 142 butts against a positioning step 144 disposed in the outer periphery of the second end portion 118b, thereby limiting the axial movement of the inner ring 142 with respect to the worm 118.

A low-friction resin layer 146 is disposed on the outer periphery of the second bearing 126, i.e., the outer periphery 145a of the outer ring 145. The low-friction resin layer 146 is made of a low-friction resin such as polyacetal, and integrated with the outer ring 145 by means of fitting. The inner periphery 146a of the low-friction resin layer 146 is configured by a cylindrical surface which extends along the outer periphery 145a of the outer ring 145. Axial crowning is applied to the sliding contact surface 146b disposed on the outer periphery of the low-friction resin layer 146.

A housing hole 147 for housing the second bearing 126 in which the low-friction resin layer 146 is formed is disposed in the housing 117a. The housing hole 147 is formed into a bias bore which can biasably hold the second bearing 126 in which the low-friction resin layer 146 is formed, in directions Y1, Y2 (the increasing direction Y1 and the decreasing direction Y2) in which the center-to-center distance D1 (corresponding to the distance between the rotation center C1 of the worm 118 and the rotation center C2 of the worm wheel) between the worm 118 and the worm wheel 119 is increased and decreased.

The electric power steering device 101 includes a backlash eliminating mechanism 150 which eliminates backlash between the worm 118 and the worm wheel 119.

Figure 10:
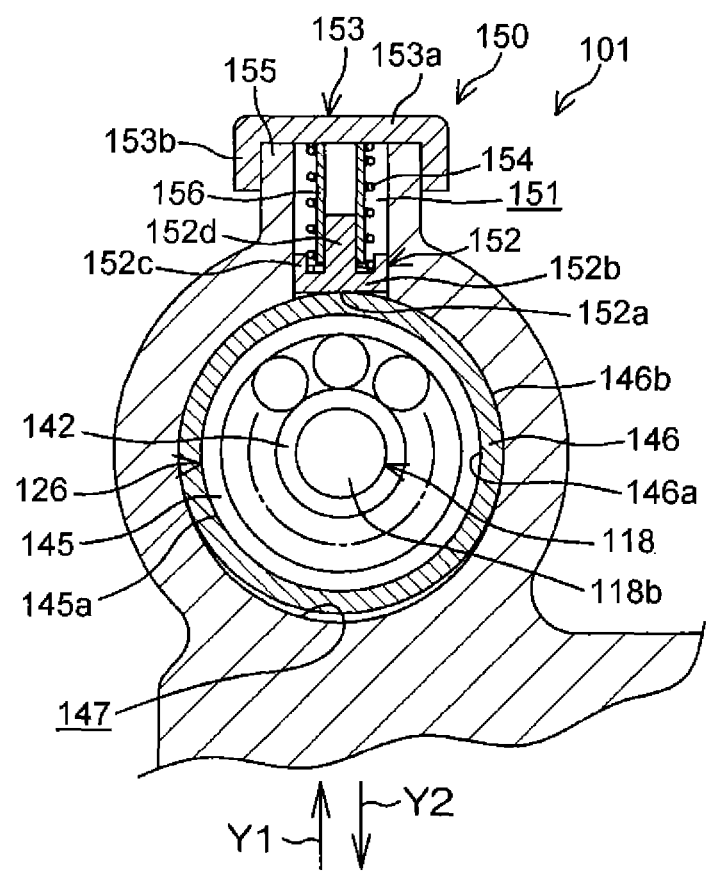
FIG. 10 is a sectional view taken along line 10-10 in FIG. 8 and showing the periphery of a second end portion of the worm.

As shown in FIG. 8 and FIG. 10 which is a sectional view taken along line 10-10 in FIG. 8, the backlash eliminating mechanism 150 includes: a supporting hole 151 which is disposed in the housing 117a so as to communicate with the housing hole 147; a pressing member 152 which is supported so as to be slidable in the depth direction of the supporting hole 151, and which butts against the low-friction resin layer 146; a sealing member 153 which seals an end portion of the supporting hole 151; and an urging member 154 which is interposed between the sealing member 153 and the pressing member 152 to elastically urge the second end portion 118b of the worm 118 toward the worm wheel 119 (in the direction Y2 in which the center-to-center distance D1 is decreased) through the pressing member 152 and the second bearing 126, and which is configured by, for example, a compression coil spring.

The supporting hole 151 elongates from the housing hole 147 in the direction opposite to the worm wheel 119. The supporting hole 151 passes through a cylindrical projection 155 disposed on the housing 117a. The sealing member 153 includes an end wall 153a which closes the opening of the end portion of the supporting hole 151, and a peripheral sidewall 153b, and a female threaded portion of the inner periphery of the peripheral sidewall 153b is screwed to a male threaded portion of the outer periphery of an end portion of the cylindrical projection 155, whereby the sealing member 153 is fixed to the cylindrical projection 155.

The pressing member 152 includes: a pressing portion 152b having a flat pressing surface 152a; a cylindrical portion 152c which extends from the outer periphery of the pressing portion 152b, and which is slidably supported by the inner periphery of the supporting hole 151; and a shaft portion 152d which extends from a middle portion of the pressing portion 152b toward the sealing member 153.

A cylindrical spring guide 156 is fitted to the outer periphery of the shaft portion 152d. The spring guide 156 is passed through the interior of the urging member 154 configured by a compression coil spring, to prevent the urging member 154 from falling over. One end of the urging member 154 is placed between the outer periphery of the spring guide 156 and the inner periphery of the cylindrical portion 152c.

The urging member 154 serving as an interposing member, and the pressing member 152 serving as an interposing member are interposed between the sealing member 153 which is fixed to the cylindrical projection 155 integrated with the housing 117a, and the low-friction resin layer 146. When the worm 118 which is urged in the axial directions X1 by the elastic members 127A, 127B is moved in the axial directions X1, the second bearing 126 in which the low-friction resin layer 146 is disposed is co-moved with the worm 118.

At this time, a part of the outer periphery of the low-friction resin layer 146 is in sliding contact with the pressing surface 152a of the backlash eliminating mechanism 150. Moreover, another part of the outer periphery of the low-friction resin layer 146 is in sliding contact with the inner periphery of the housing hole 147. The supporting hole 151 constitutes a part of the housing hole 147, and indirectly receives a part of the low-friction resin layer 146 through the interposing members (the urging member 154, the pressing member 152). In the case where a load is applied to the worm 118, the low-friction resin layer 146 and the housing hole 147 are in sliding contact with each other in the upper side of FIG. 10. In the case where the worm wheel 119 is worn, they may be sometimes in sliding contact with each other in the lower side of FIG. 10.

According to the embodiment, the low-friction resin layer 146 is disposed on the outer periphery (outer periphery 145a of the outer ring 145) of the second bearing 126, and therefore the frictional resistance between the housing hole 147 and the low-friction resin layer 146 or that between the interposing member (pressing member 152) and the low-friction resin layer 146 can be reduced. Consequently, the axial movement of the worm 118 which is urged in the axial directions X1 by the pair of elastic members 127A, 127B that are on the both sides of the first bearing 125 is performed very smoothly, so that, also in fine steering in which the worm 118 does not receive a driving force, the play due to the internal clearances of the two bearings 125, 126 can be surely eliminated, and the steering feeling can be improved. Moreover, a shock in a reverse input from the road surface can be buffered by the low-friction resin layer 146, and a reduced noise level can be realized.

Moreover, the crowning is applied in the axial directions X1 to the outer periphery (sliding contact surface 146b) of the low-friction resin layer 146, and therefore a sufficient swing amount can be ensured when the worm 11B is caused to swing by a reverse input from the road surface. Consequently, the prying of the worm 118 can be prevented from occurring. Moreover, the crowning can reduce the contact area between the urging member 154 and the low-friction resin layer 146, and therefore the swinging and axial movement of the worm 118 can be performed more smoothly.

The invention is not limited to the above-described embodiments. In the embodiment of FIG. 9, for example, the pair of elastic members 127A, 127B are placed on the both sides of the inner ring 128 of the first bearing 125 with respect to the axial direction X1 of the worm 118, respectively. The elastic members 127A, 127B are interposed between the inner ring 128 of the first bearing 125 and the predetermined portions of the worm 118, and elastically urge the worm 118 to the neutral position in the axial directions X1 with respect to the inner ring 128.

Figure 11:
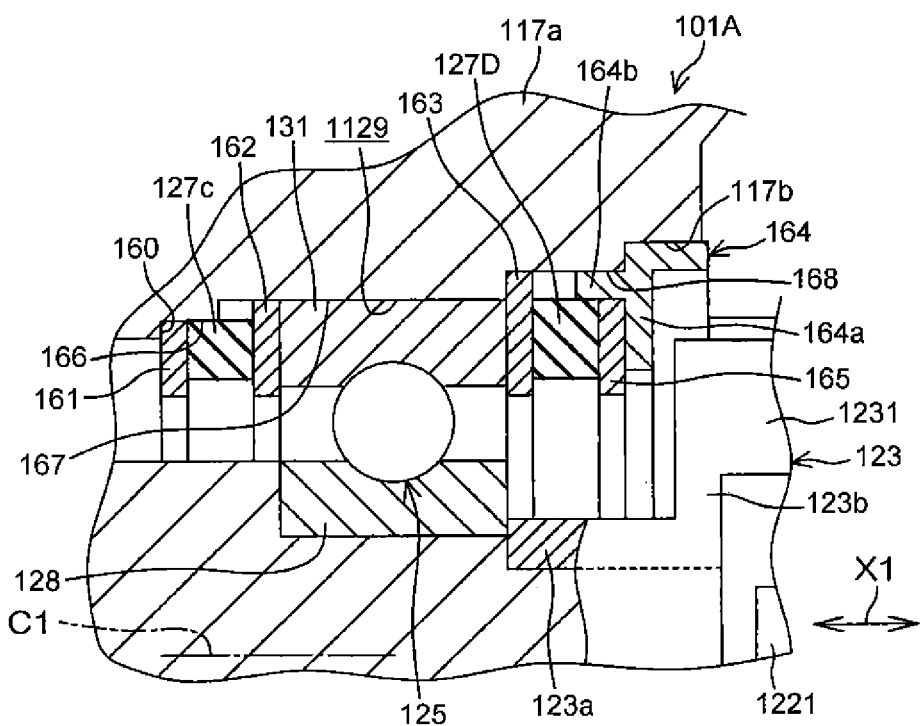
FIG. 11 is an enlarged sectional view of main portions of an electric power steering device of a third embodiment and showing the periphery of a first end portion of a worm.

As shown in an electric power steering device 101A of an embodiment of FIG. 11, alternatively, a pair of elastic members 127C, 127D may be placed on the both sides of the outer ring 131 of the first bearing 125 with respect to the axial directions X1 of the worm 118, respectively. In the alternative, the elastic members 127C, 127D are interposed between the outer ring 131 of the first bearing 125 and (predetermined portions) of the housing 117a, and elastically urge the worm 118 to the neutral position in the axial directions X1 through the first bearing 125. The elastic members 127C, 127D are bushes formed by an elastic material such as rubber or a thermoplastic elastomer.

The one elastic member 127C is interposed between an annular receiving plate 161 which butts against a positioning step 160 of the inner periphery of the housing 117a, and an annular receiving plate 162 which butts against one end surface of the outer ring 131. The other elastic member 127D is interposed between an annular receiving plate 163 which butts against the other end surface of the outer ring 131, and a receiving plate 165 which butts against an annular flange 164a of a screw member 164 screwed to a threaded portion 117b of the housing 117a. The receiving plates 161, 162, 163, 165 are made of, for example, a metal.

A first annular recess 166 into which the receiving plate 161 and the one elastic member 127C are fitted, a second annular recess 167 into which the receiving plate 162 and the outer ring 131 are fitted, and a third annular recess 16B into which the receiving plate 163 and a cylindrical projection 164b of the screw member 164 are fitted are disposed in a bearing holding hole 1129 of the housing 117a. The outer diameters of the first annular recess 166, the second annular recess 167, and the third annular recess 168 are stepwise increased in this sequence.

Among the components of the embodiment of FIG. 11, those which are identical to those of the embodiment of FIGS. 7 to 10 are denoted by the same reference numerals as those of the embodiment of FIGS. 7 to 10. Also in the embodiment of FIG. 11, in the electric power steering device 101A in which the worm 118 is movable in the axial directions X1, a good steering feeling in fine steering can be ensured.

The invention is not limited to the above-described embodiments, and various changes can be made within the scope of the claims of the invention.

REFERENCE SIGNS LIST

1 . . . electric power steering device, 2 . . . steering member, 3 . . . steering shaft, 16 . . . electric motor, 17 . . . speed reducer, 17a . . . housing, 18 . . . worm, 18a . . . first end portion, 18b . . . second end portion, 19 . . . worm wheel, 20 . . . rotation shaft (of electric motor), 21 . . . joint, 25 . . . first bearing, 26 . . . second bearing, 27A, 27B . . . elastic member, 28 . . . inner ring (of first bearing), 31 . . . outer ring (of first bearing), 42 . . . inner ring (of second bearing), 45 . . . outer ring (of second bearing), 95a . . . outer periphery (cylindrical surface), 46 . . . synthetic resin member, 46b . . . sliding contact surface, 47 . . . bearing holding hole, 50 . . . leaf spring, 51 . . . main body portion, 51a, 51b . . . end portion, 51e . . . inner periphery (cylindrical surface), 52 . . . rotation limiting portion, 53 . . . elastic tongue piece, 54 . . . receiving recess, 54a, 54b . . . inner wall, 54c . . . bottom, C1 . . . rotation center (of worm), C2 . . . rotation center (of worm wheel), D1 . . . center-to-center distance, F1, F2, F3 . . . urging force, X1 . . . axial direction (of worm), Y1 . . . direction in which center-to-center distance is increased, Y2 . . . direction in which center-to-center distance is decreased, Z1 . . . circumferential direction (of bearing holding hole)

101; 101A . . . electric power steering device, 102 . . . steering member, 103 . . . steering shaft, 116 . . . electric motor, 117 . . . speed reducer, 117a . . . housing, 118 . . . worm, 118a . . . first end portion, 118b . . . second end portion, 119 . . . worm wheel, 120 . . . rotation shaft (of electric motor), 121 . . . joint, 125 . . . first bearing, 126 . . . second bearing, 127A, 127B; 127C, 127D . . . elastic member, 128 . . . inner ring (of first bearing), 131 . . . (outer ring of first bearing), 142 . . . inner ring (of second bearing), 145 . . . outer ring (of second bearing), 145a . . . outer periphery (cylindrical surface), 146 . . . low-friction resin layer, 146b . . . sliding contact surface, 147 . . . housing hole, 150 . . . backlash eliminating mechanism, 152 . . . pressing member (interposing member), 154 urging member (interposing member), C1 . . . rotation center (of worm), C2 . . . rotation center (of worm wheel), D1 . . . center-to-center distance, X1 . . . axial direction (of worm), Y1 . . . direction in which center-to-center distance is increased, Y2 . . . direction in which center-to-center distance is decreased

The invention claimed is:

1. An electric power steering device comprising:
a worm having a first end portion which is connected swingably and torque-transmittably to a rotation shaft of an electric motor through a joint, and having a second end portion which is on a side opposite to the first end portion;
a worm wheel which meshes with the worm;
a housing which houses the worm and the worm wheel;
a first bearing which is held by the housing, the first bearing rotatably supporting the first end portion of the worm;
a second bearing which rotatably supports the second end portion of the worm;
a pair of elastic members which are placed on both sides of the first bearing with respect to an axial direction of the worm, respectively, the pair of elastic members elastically urging the worm to an axial neutral position;
an annular leaf spring having an inner circumferential surface, the annular leaf spring held by the housing through frictional engagement to surround a periphery of the second bearing, the annular leaf spring elastically urging the second end portion of the worm toward the worm wheel through the second bearing; and
a synthetic resin member having: (i) a first contact surface that is in sliding contact with the leaf spring, the synthetic resin member sliding along the inner circumferential surface of the leaf spring in the axial direction of the worm, a frictional force between the leaf spring and the sliding contact surface of the synthetic resin member being smaller than a frictional force between the leaf spring and the housing; and (ii) a second contact surface that is in contact with an outer periphery of the second bearing through fitting the synthetic resin member adjacent to the outer periphery of the second bearing.

2. The electric power steering device according to claim 1, wherein
the first contact surface of the synthetic resin member has a crowning shape including a convex arcuate surface in a section containing a rotational center of the worm, and
the leaf spring includes a cylindrical surface with which the first contact surface is in sliding contact.

3. The electric power steering device according to claim 1, wherein
the leaf spring includes:
an open-ended annular main body portion which surrounds the first contact surface of the synthetic resin member;
a pair of rotation limiting portions which extend in a bent manner from a pair of circumferential end portions of the main body portion, respectively; and
a pair of cantilever-like elastic tongue pieces which extend from the pair of rotation limiting portions, respectively,
the housing includes a bearing holding hole which holds the second bearing through the leaf spring,
an inner periphery of the bearing holding hole includes a receiving recess which is recessed in a direction opposite to the worm wheel with respect to the second bearing,
the receiving recess includes:
a bottom which receives tip ends of the pair of elastic tongue pieces; and
a pair of inner walls which are opposed to each other in circumferential directions of the bearing holding hole, and which are respectively engaged with the pair of rotation limiting portions to limit rotation of the leaf spring, and
the pair of elastic tongue pieces are configured to apply urging forces to the second bearing in two directions which are inclined oppositely to each other toward the worm wheel, through the corresponding rotation limiting portions and corresponding end portions of the main body portion, respectively.

4. An electric power steering device comprising:
a speed reducer having a worm and a worm wheel;
an electric motor which drives the worm;
a housing which houses the speed reducer;
a first bearing which rotatably supports a first end portion of the worm;
a second bearing which rotatably supports a second end portion of the worm;
a pair of elastic members which are placed on both sides of the first bearing with respect to an axial direction of the worm, respectively, the pair of elastic members being placed between the first bearing and the housing, or between the first bearing and the worm, the pair of elastic members elastically supporting the worm in the axial direction;
a housing hole which is disposed in the housing; and
a low-friction resin layer having: (i) a first contact surface that is in sliding contact with the housing hole and an interposing member, the low-friction resin layer sliding along the housing hole and the interposing member in the axial direction of the worm, and (ii) a second contact surface that is in contact with an outer periphery of the second bearing through fitting the low-friction resin layer adjacent to the outer periphery of the second bearing, wherein the interposing member includes a shaft portion aligned alone a spring guide such that the interposing member is pressed into the first contact surface of the low-friction resin layer.

5. The electric power steering device according to claim 4, further comprising:

an urging member which is supported by the housing, and which urges the low-friction resin layer in a direction in which a center-to-center distance between the worm and the worm wheel is decreased; and a joint which is placed between the first end portion of the worm and a rotation shaft of the electric motor, and which swingably connects both shafts together, wherein axial crowning is applied to an outer periphery of the low-friction resin layer.

6. The electric power steering device according to claim 1, wherein the synthetic resin member extends across a receiving recess of the housing.

7. The electric power steering device according to claim 4, wherein the low-friction resin layer extends across a receiving recess of the housing.

* * * * *